(12) United States Patent
Moen

(10) Patent No.: US 8,856,353 B2
(45) Date of Patent: Oct. 7, 2014

(54) METHOD AND APPARATUS FOR PROVIDING AN EXTENDED SOCKET API FOR APPLICATION SERVICES

(75) Inventor: Daniel Gilbert Moen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 13/414,890

(22) Filed: Mar. 8, 2012

(65) Prior Publication Data

US 2013/0238806 A1    Sep. 12, 2013

(51) Int. Cl.
- *G06F 15/16* (2006.01)
- *H04L 12/28* (2006.01)
- *H04L 25/02* (2006.01)
- *H04L 29/08* (2006.01)

(52) U.S. Cl.
CPC ........ *H04L 12/2872* (2013.01); *H04L 25/0298* (2013.01); *H04L 29/08603* (2013.01); *H04L 67/145* (2013.01)
USPC ........... 709/227; 709/203; 709/219; 709/224; 709/228; 713/176; 726/7; 370/401; 370/419

(58) Field of Classification Search
CPC ............ H04L 12/2872; H04L 25/0298; H04L 29/08603; H04L 64/145
USPC .......................................................... 709/227
See application file for complete search history.

(56) References Cited

U.S. PATENT DOCUMENTS

| 6,006,268 | A  | * | 12/1999 | Coile et al. | ..................... 709/227 |
|---|---|---|---|---|---|
| 6,775,692 | B1 | * | 8/2004 | Albert et al. | .................. 709/207 |
| 2003/0202522 | A1 | * | 10/2003 | Jiang | ............................. 370/401 |
| 2005/0175016 | A1 | * | 8/2005 | Kim et al. | ................ 370/395.52 |
| 2006/0047839 | A1 | * | 3/2006 | Tate et al. | ..................... 709/230 |
| 2010/0217990 | A1 | * | 8/2010 | Abe et al. | ...................... 713/176 |

OTHER PUBLICATIONS

Google Prior Art search.*
Google Patent search.*
ACM search.*
IP.com search.*

* cited by examiner

*Primary Examiner* — Arvin Eskandarnia
(74) *Attorney, Agent, or Firm* — Meunier Carlin & Curfman, LLC

(57) ABSTRACT

Methods and apparatus for providing an extended socket API are disclosed. A method for providing a socket API according to an implementation of the invention may include: receiving data at a first network socket; opening a second network socket; associating the first network socket and the second network socket using a socket file descriptor of a client-side connection; and directing the data from the first network socket to the second network socket. When an application service utilizes the socket API, the method may further include processing the data, i.e., performing a service.

20 Claims, 5 Drawing Sheets

METHOD AND APPARATUS FOR PROVIDING AN EXTENDED SOCKET API FOR APPLICATION SERVICES

BACKGROUND

Integration of application services into a network can be a difficult and costly undertaking, which is especially the case when the network devices are provided by different vendors. For example, an application control module may provide a high-performance network stack capable of terminating millions of TCP flows, as well as handling UDP and raw IP traffic. The Application Control Engine (ACE) module of CISCO SYSTEMS INC., San Jose, Calif. is one example application control module. However, the ACE module does not have a standard socket API for interacting with application services that operate on network data streams.

When an application service processes a packet, the service accepts data from an inbound connection, processes the data (i.e., performs a service) and forwards the data to an outbound connection. Existing socket APIs do not allow association between the inbound and outbound connections. There are, however, situations where association between the inbound and outbound connections may be desirable, such as when providing server load-balancing service (SLB) functions or providing L7 service functions (and particularly when the L7 service functions are chained).

For example, an SLB service may be run on top of an existing application control module, such as the ACE module discussed above, using the standard socket API. The standard socket API functions by terminating a connection from the client machine to a virtual IP (VIP) address of a server running the application control module and opening a new connection from a host IP address of the server running the application control module (other than the VIP) to a destination server. The load-balancing service then acts as a "man in the middle" by accepting data from the client machine, processing the data (i.e., performing an algorithm to select the best server to satisfy the client needs) and forwarding the data to the selected destination server. Using the standard socket API, two distinct connections exist, and the relationship between the connections is not maintained by the SLB service. In other words, the client communicates with the server running the application control module, and the server running the application control module communicates with the selected destination server.

Similarly, an L7 service may be run on top of an existing application control module using the standard socket API. When L7 services are chained, however, the input and output connections must be associated by the L7 services to ensure reliability of packet delivery and packet order. This may not be possible using the standard socket API because there may not be a one-to-one relationship between the packets sent to each L7 service and the packets received by each L7 service and each L7 service is free to open additional connections that are unrelated to a particular packet.

SUMMARY

Methods and apparatus for providing an extended socket API are disclosed herein. The extended socket API may be used when providing application services such as SLB or L7 service functions, for example. A method for providing a socket API according to an implementation of the invention may include: receiving data at a first network socket; opening a second network socket; associating the first network socket and the second network socket using a socket file descriptor of a client-side connection; and directing the data from the first network socket to the second network socket.

Optionally, the method may include expressly identifying the socket file descriptor of the client-side connection when opening the second network socket.

In one implementation, the socket file descriptor of the client-side connection may include an IP address and a source port of a client device.

Additionally, the method may include closing at least one of the first network socket and the second network socket.

A method for providing application services according to another implementation of the invention may include: receiving data at a first network socket; opening a second network socket; associating the first network socket and the second network socket using a socket file descriptor of a client-side connection; directing the data from the first network socket to the second network socket; and processing the data.

Optionally, the method may include expressly identifying the socket file descriptor of the client-side connection when opening the second network socket. The socket file descriptor of the client-side connection may include an IP address and a source port of a client device.

Additionally, the method may include closing at least one of the first network socket and the second network socket.

In another implementation, the method may include unproxying the first network socket and the second network socket. In addition, a portion of the data may be directed from the first network socket to the second network socket without being processed while the first network socket and the second network socket are unproxied.

Alternatively or additionally, the first network socket and the second network socket may be unproxied until a predetermined amount of data is directed between the first network socket and the second network socket.

In other implementations, the method may include proxying the first network socket and the second network socket after unproxying the first network socket and the second network socket. Further, the data directed from the first network socket to the second network socket may be processed when the first network socket and the second network socket are proxied.

Additionally, processing the data may include providing a service function such as a server load-balancing function, for example.

In yet another implementation, the method may include: transmitting the data through the second network socket; and providing a second service function. In this implementation, the second service function may provide a different type of service than the service function. For example, the service function and the second service function may provide L7 services.

A non-transient computer-readable storage medium according to yet another implementation of the invention may include computer-executable instructions stored thereon that cause a computing device to: receive data at a first network socket; open a second network socket; associate the first network socket and the second network socket using a socket file descriptor of a client-side connection; direct the data from the first network socket to the second network socket; and process the data.

Optionally, the first network socket and the second network socket may be associated by expressly identifying the socket file descriptor of the client-side connection when opening the second network socket.

In one implementation, the socket file descriptor of the client-side connection may include an IP address and a source port of a client device.

Alternatively or additionally, the non-transient computer-readable storage medium may include further computer-executable instructions that cause the computing device to unproxy the first network socket and the second network socket. A portion of the data may be directed from the first network socket to the second network socket without being processed while the first network socket and the second network socket are unproxied.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for providing an extended socket API for use with SLB and L7 service functions, it will become evident to those skilled in the art that the implementations are not limited thereto, but are applicable for providing an extended socket API for use with any type of application service.

Figure 1:
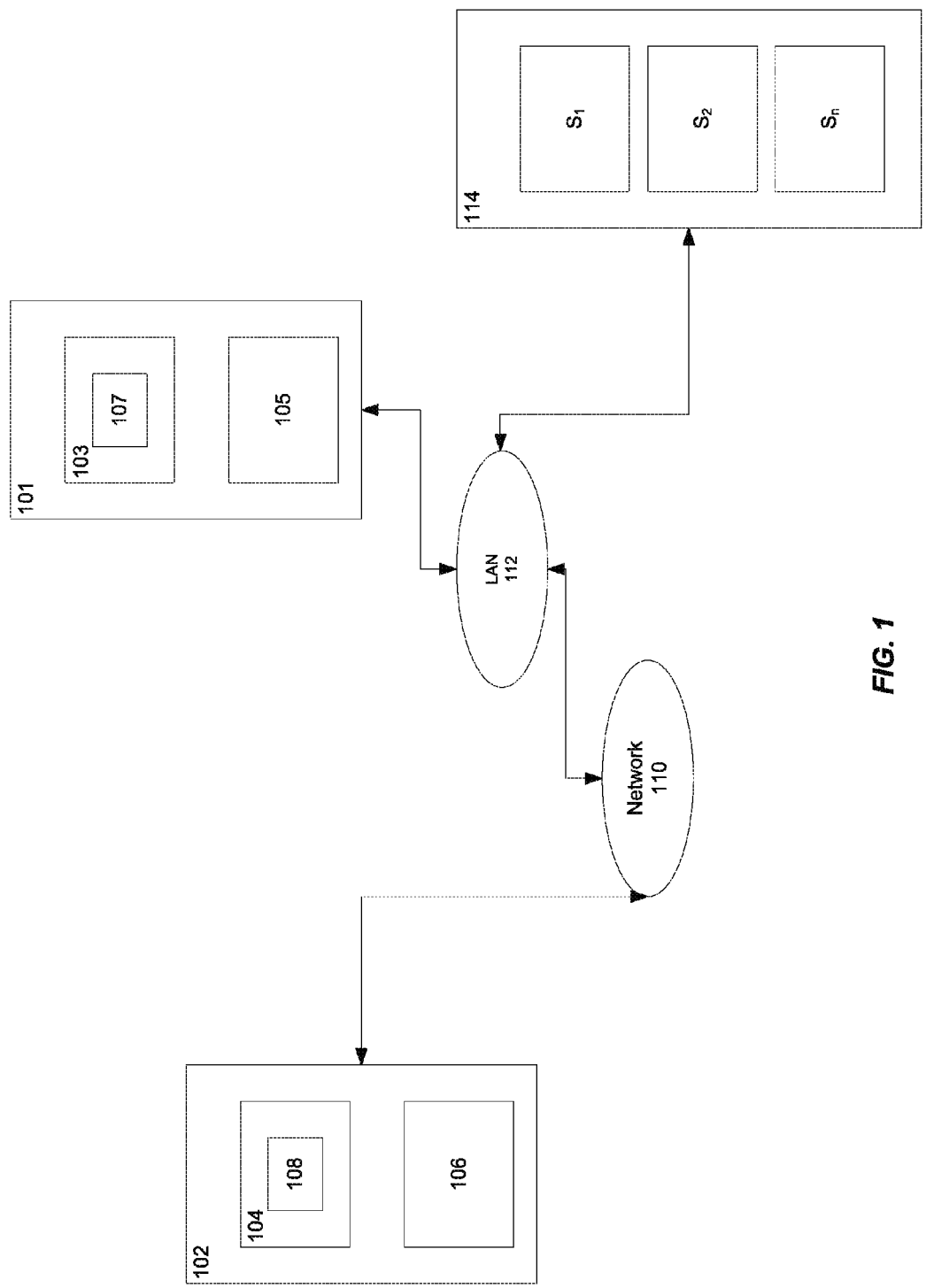
FIG. 1 is a block diagram of a system for providing an application service in a network environment.

Referring to FIG. 1, a system for providing an application service in a network environment is illustrated. The system includes a client device 102 such as a desktop or laptop computer, a handheld mobile device, a tablet, etc. connected to a network 110. The network 110 may be a wide area network (WAN), i.e., the Internet, for example. Optionally, the client device 102 may be connected to the network 110 through a local area network (LAN). The client device 102 may be provided with client applications 108 for providing user interaction with the client device 102 and/or other devices connected to the network 110. For example, the client applications 108 may be performed by executing executable commands that are stored in system memory 104 of the client device 102 with a processing unit 106.

The system the FIG. 1 may also include an application server 101 connected to the network 110. The application server 101 is connected to the network 110 through LAN 112. The LAN 112 is an internal network of a public or private institution such as a business, a university or a government department. However, in some implementations, the application server 101 may be directly connected to the network 110. The application server 101 may be provided with application programs 107. The application programs 107 may provide various "services" to the client device 102. The application programs 107 may be performed by executing executable commands that are stored in the system memory 103 of the application server 101 with a processing unit 105.

For example, one of the application programs 107 may provide a SLB function. SLB is the process of deciding to which server $S_1, S_2 \ldots S_n$, of a server farm 114 the application server 101 should send a client request for service. Although there are three servers shown in FIG. 1, the server farm 114 may include any number of servers. The client device 102 may send a request for a webpage or to download a file, and the application server 101 may select which of the servers $S_1, S_2 \ldots S_n$ is best suited to fulfill the client request in the shortest amount of time without overloading the selected server and/or the server farm 114. The application server 101 may provide the SLB function with a number of SLB algorithms to predict which server $S_1, S_2 \ldots S_n$ is best suited to service the client request. The SLB algorithms may include, but are not limited to, a round-robin algorithm, a least-connection algorithm based on a number of current connections, a hash address algorithm based on the source and/or destination IP address, a hash cookie algorithm based on a cookie name, a hash header algorithm based on the HTTP header name or a hash URL algorithm based on the requested URL. In addition to providing an SLB function, the application programs 107 may provide L7 service functions, which are discussed below with regard to FIG. 3, as well as any other service function.

The connections shown in FIG. 1 to the network 110 may be any type of wire, optical fiber or wireless connection, for example, Wi-Fi (IEEE 802.11x), WiMax (IEEE 802.16), Ethernet, 3G, 4G, etc. In addition, the client device 102, the application server 101 and the servers $S_1, S_2 \ldots S_n$ may be implemented using the hardware shown in the general computing device of FIG. 5.

Figure 2A:
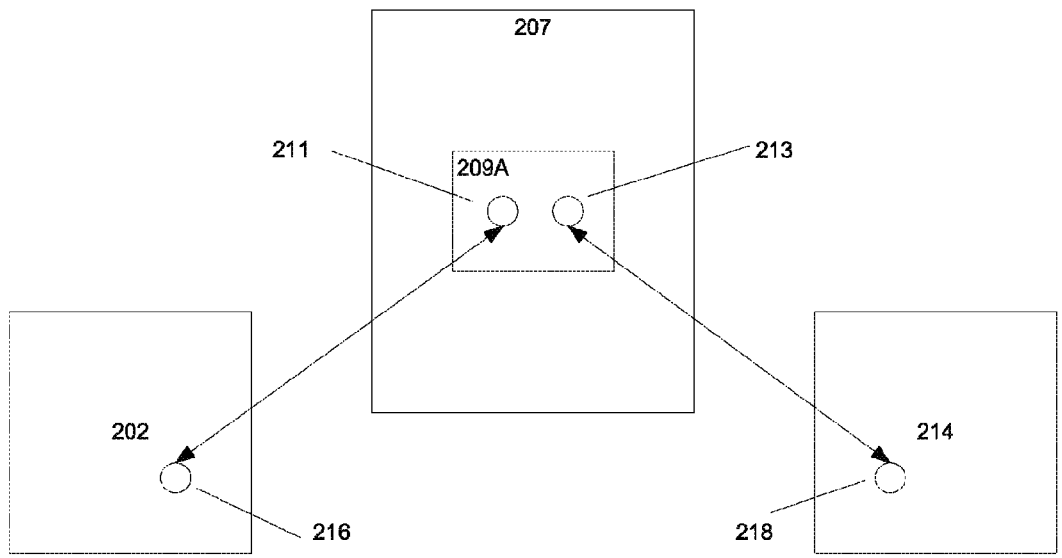
FIGS. 2A and 2B are block diagrams illustrating logical connections formed while providing an application service.
Figure 2B:
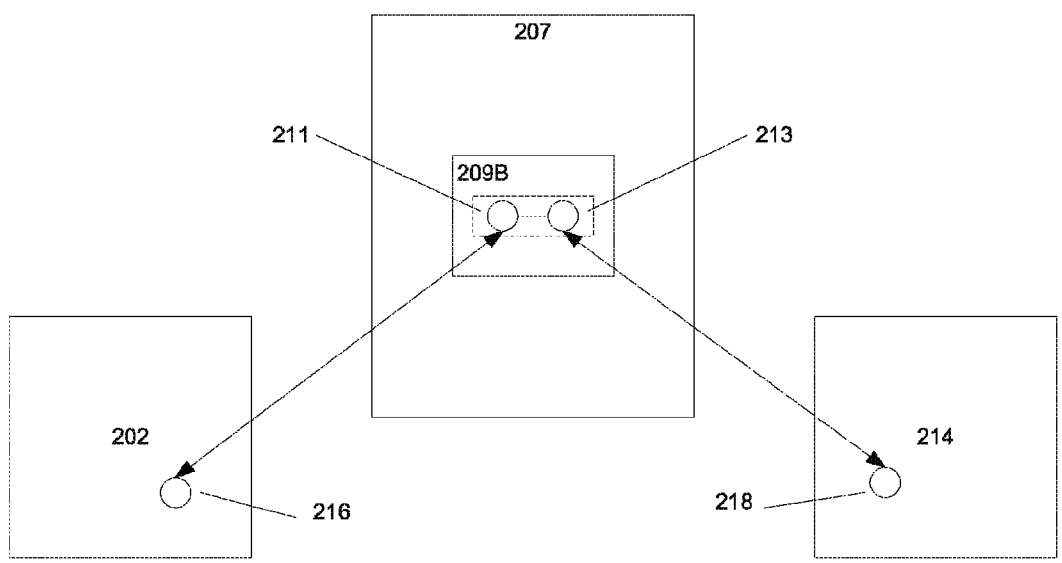

FIGS. 2A and 2B are block diagrams illustrating logical connections formed while providing application services within the system of FIG. 1. Referring to FIG. 2A, the logical connections formed while providing an application service using the standard socket API are shown. The standard socket API 209A allows the application program 207 to control and use network sockets. The standard socket API 209A terminates the connection from a client device 202 and opens a new connection to a destination server 214. Specifically, the standard socket API 209A maintains two separate connections. The first connection is between a source port 216 of the client device 202 and an inbound socket 211, which is bound to a VIP address of the application server, and the second connection is between an outbound socket 213, which is bound to a VIP address of the application server, and a destination port 218 of the destination server 214. After the connections are established, the application program 207 processes the incoming data received from the source port 216 and sends the processed data to the destination port 218. However, the standard socket API 209A does not associate the inbound socket 211 and the outbound socket 213.

Referring to FIG. 2B, the logical connections formed while providing an application service using an extended socket API are shown. Similarly to the standard socket API 209A shown in FIG. 2A, the extended socket API 209B also allows the application program 207 to control and use network sockets. In fact, the extended socket API 209B shares all of the existing capabilities of the standard socket API 209A. However, the extended socket API 209B may be provided with additional functionality. For example, the extended socket API 209B may associate the inbound socket 211 and the outbound socket 213. When the extended socket API 209B establishes a new connection (i.e., by opening the outbound socket 213), the extended socket API 209B may express the relationship to the inbound socket 211 in order to associate the inbound and outbound sockets 211 and 213. In some implementations, the call that creates the outbound socket 213 may expressly identify the inbound socket 211 with the socket file descriptor of the client-side connection, which contains the source IP address and the source port, for example. By associating the inbound socket 211 and the outbound socket 213, all of the data sent or received on either socket will be associated with the other flow by the transport layer. Thus, source network address translation (NAT) is unnecessary when the inbound socket 211 and the outbound socket 213 are associated.

Once the extended socket API 209B associates the inbound and outbound sockets 211 and 213, additional functionality may be provided. For example, the associated inbound and outbound sockets 211 and 213 may be suspended, or unproxied. This may be advantageous when the application program 207 no longer needs to perform a service (i.e., process the data), but the connection between the client device and the destination server should remain intact. For example, the destination server may be streaming data to the client device. In this case, the application program 207 may not need to process the streamed data, and in order to minimize processing load, the data may be passed from the inbound socket 211 to the outbound socket 213 without the service being performed by the application program 207. This may free system resources for other uses.

In some implementations, the inbound socket 211 and the outbound socket 213 may be unproxied until a predetermined amount of data passes through the connection. Optionally, the predetermined amount of data may be specified in an unproxy until function call. Then, after the predetermined amount of data passes through the connection, the application program 207 may again begin to process the data. Further, after the connection has been unproxied, the associated inbound socket 211 or outbound socket 213 may be found and proxied at any time using a get function call, for example. Additionally, any existing unconnected sockets (i.e., unconnected inbound and outbound sockets) may be linked to create a connection and any connected sockets may be unlinked to terminate a connection using an associate or disassociate function call, respectively.

In the implementations discussed above, the application program 207 may be responsible for closing both the inbound and outbound sockets 211 and 213. Optionally, the application may be free to close one socket (i.e., the inbound socket or client-side connection, for example) and hold on to the other socket (i.e., the outbound socket or server-side connection, for example). In this case, the other socket (i.e., the outbound socket or server-side connection) may be "parked" for reuse at a later time. As discussed above, the client-server connection may be reestablished using the associate function call (if both the client-side connection and the server-side connection are unused). When the connection is unproxied, however, both the inbound socket 211 and the outbound socket 213 may be closed by default if either side closes the connection.

Example calls for an extended socket API according to the implementation of the invention are shown below:

(1)
int ext_connect(int sockfd, const struct sockaddr *serv_addr, socklen_t addrlen, int osockfd)
(2)
int ext_unproxy(int sockfd)
(3)
int ext_unproxy_until(int sockfd, unsigned long byte_count)
(4)
int ext_get_associated_socket(int sockfd)
(5)
int ext_associate(int sockfd1, int sockfd2)
(6)
int ext_disassociate(int sockfd1, int sockfd2)

In (1), the inbound socket is expressly identified when opening the outbound socket. For example, the file descriptor of the client-side connection ("osockfd") may be provided within the connect function call. Referring to (2) and (3), an unproxy call and an unproxy until call are shown. The unproxy calls may be used to suspend, but not terminate, the connection between the inbound socket and the outbound socket. The unproxy until call shown in (3) differs from the unproxy call shown in (2) by specifying an amount of data ("unsigned long byte_count") that should pass through the connection while the connection is suspended. After a connection is suspended, the associated inbound socket or outbound socket may be found using the get function call shown in (4). Referring to (5) and (6), associate and disassociate function calls are shown.

Figure 3:
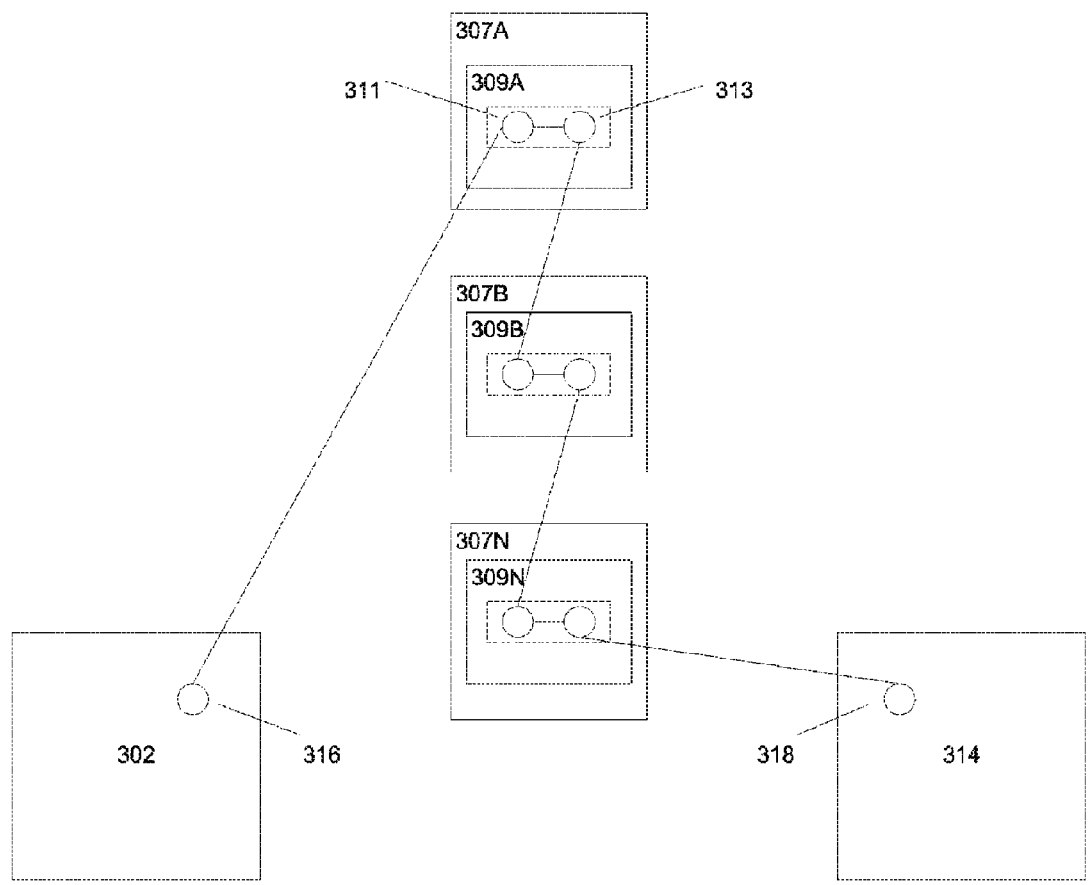
FIG. 3 is a block diagram illustrating logical connections formed while providing chained application services.

FIG. 3 is a block diagram illustrating logical connections formed while providing chained application services. In one implementation, the chained application services may be L7 services. The code of an L7 service is typically written to operate on a stream of data, and the stream must be reliable in terms of packet delivery and packet order. Thus, each L7 service must be fronted with a flow termination endpoint. The extended socket API discussed above may be used with socket-based applications that perform L7 services (e.g., SSL, compression, etc.). This may be particularly useful when the L7 services are chained because the inbound and outbound flows of each L7 service can be associated by the extended socket API.

A chain of L7 services may be utilized such that a service is performed on a data stream, and the data stream is then directed to the next hop in the chain. Chained application services are shown as service programs 307A, 307B and 307N in FIG. 3. Although FIG. 3 shows three application services in a chain, any number of services may be chained together. In FIG. 3, a first service program 307A may receive a data stream from a source port 316 of a client device 302 at an inbound socket 311. The first service program 307A may provide a decompression service, for example. Because the extended socket API 309A associates the inbound and outbound sockets 311 and 313, the first service program 307A may perform a table look-up to determine the next hop in the chain (i.e., a second service program 307B) to which the data stream must be directed. The second service program 307B may provide an SLB service, for example. After the first service program 307A processes the data stream (i.e., performs decompression, for example), the processed data stream may then be directed to the second service program 307B via an inbound socket. The extended socket API 309B associates an outbound socket with the inbound socket, and the second service program 307B may perform a table look-up to determine the next top in the chain (i.e., a third service program 307N). The third service program may provide any service in addition to the services previously provided. After the second service program 307B process the data stream, the processed data stream may then be directed to the third service program 307N via an inbound socket. Assuming the third service program 307N is the final service program in the chain, and because an outbound socket is associated with the inbound socket by the extended socket API 309N, the processed data stream may be directed to a destination port 318 of a destination server 314.

When application services are chained on a single device, a large burden is placed on the processing power of the device. Thus, clustering, or distributing the processing load to a plurality of devices, may be used to distribute the load among the plurality of available devices. Accordingly, the service programs (i.e., 307A, 307B and 307N) may each be executed by a different one of the plurality of devices. Alternatively or additionally, one or more of the service programs may be executed by on one of the plurality of devices. The extended socket API discussed above may facilitate clustering of application services on a plurality of devices by associating inbound and outbound sockets, which ensures that the hop-by-hop information will be kept in the transport layer and forwarded on to the next service in the chain of application services.

Figure 4:
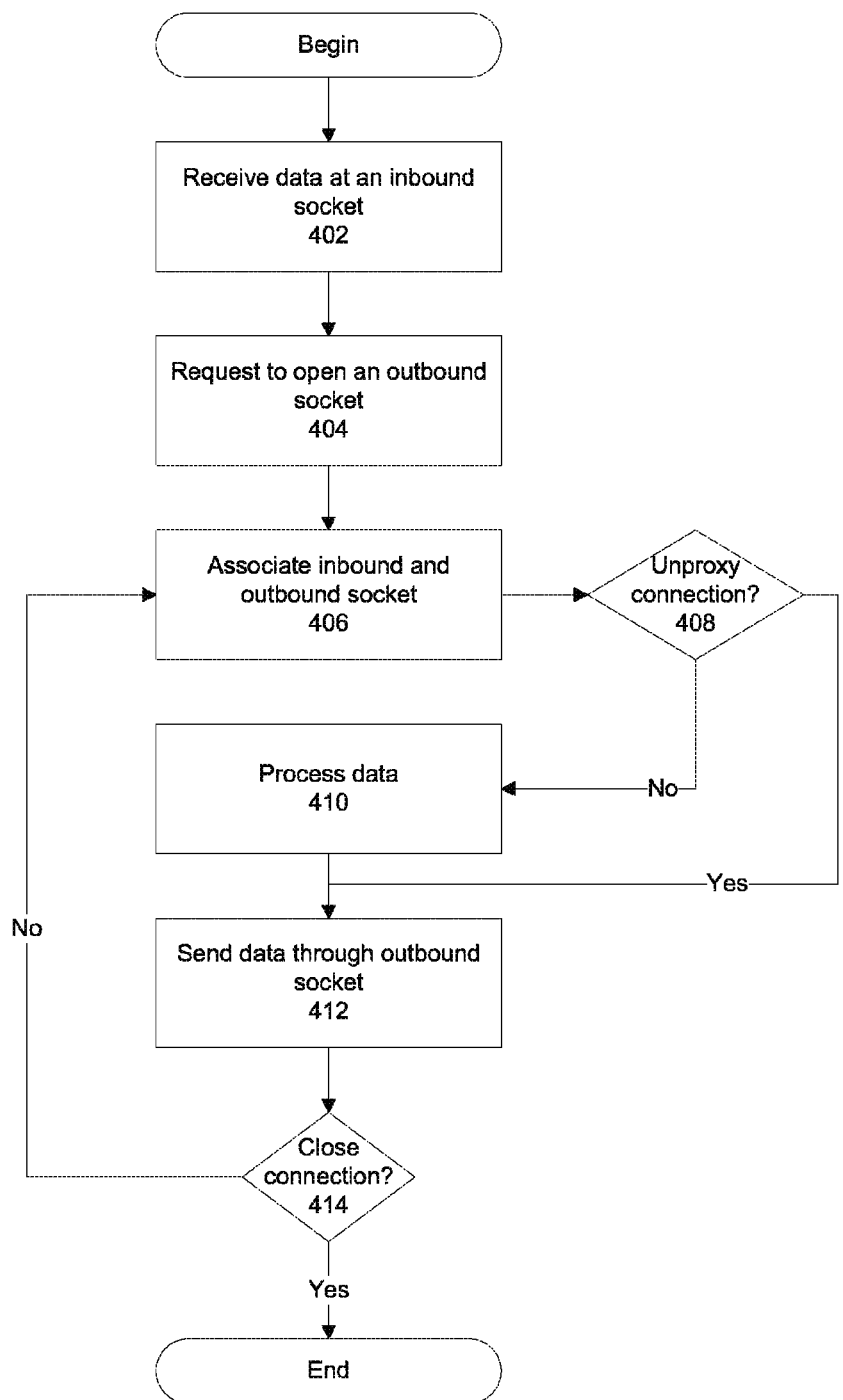
FIG. 4 illustrates a flow diagram of example operations performed within the system of FIG. 1.

Referring to FIG. 4, a flow diagram of example operations performed within the system of FIG. 1 is shown. At 402, a data stream may be received by the extended socket API at an inbound socket. Next, at 404, the extended socket API may establish a new connection by opening an outbound socket. When opening the outbound socket, the extended socket API may express the relationship between the inbound and outbound sockets in order to associate the inbound and outbound sockets at 406. For example, the extended socket API may expressly identify the inbound socket within the function call opening the outbound socket. At 408, a determination is made as to whether the connection should be unproxied. If the connection is to remain proxied, a service may be performed on the data stream at 410 before the data stream is sent through the outbound socket at 412. On the other hand, if the connection is to be unproxied, the data stream may be sent through the outbound socket at 412 without processing at 410. As discussed above, the ability to unproxy the connection may be advantageous when the connection between a client device and a destination server should remain intact but a service does not need to be performed on the data stream. At 414, a determination is made as to whether the connection should be closed. If YES, either or both of the inbound and outbound sockets may be closed. If NO, the inbound and outbound sockets remain associated, and the data stream continues to flow through the connection.

Figure 5:
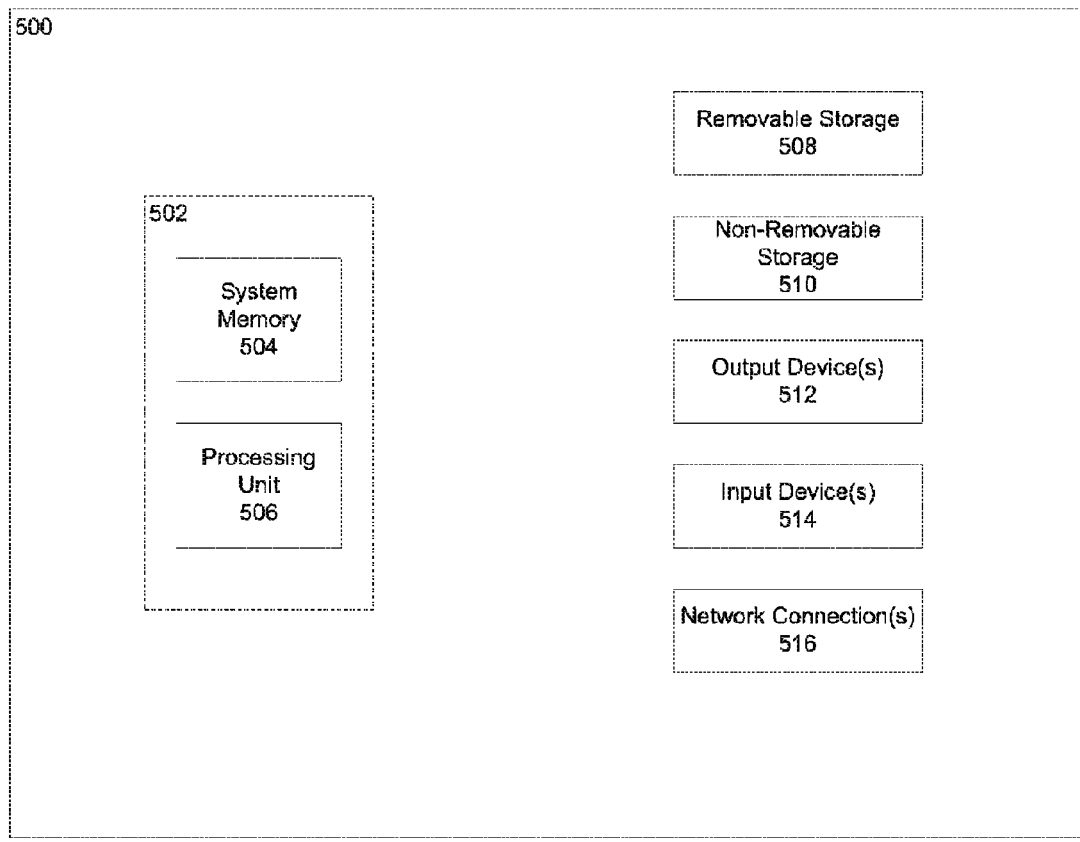
FIG. 5 is a block diagram illustrating an example computing device.

Referring to FIG. 5, a block diagram of an example computing device is illustrated. The client devices and/or servers discussed above may be computing devices, such as computing device 500 shown in FIG. 5. In its most basic configuration, computing device 500 typically includes at least one processing unit 506 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit may be a standard programmable processor that performs arithmetic and logic operations necessary for operation of the computing device 500.

The processing unit 506 may be configured to execute program code encoded in tangible, computer-readable media. For example, the processing unit 506 may execute program code stored in the system memory 504.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 514 such as a display, speakers, printer, etc. may also be included. All these devices are well known in the art and need not be discussed at length here.

Computing device 500 typically includes a variety of computer readable media. Computer readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware, firmware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The extended socket API according to the implementations discussed above associates the inbound and outbound connections, which may provide a number of advantages. First, the extended socket API allows for relatively easy integration of socket-based application services, especially for man-in-the-middle services such as SLB and NAT services. In addition, the extended socket API allows preservation of the original source IP address and source port of the client-side connection when opening an outbound connection. This may be desirable when identification information of the client device should be preserved by the server, i.e., for logging or security reasons. Next, the extended socket API may allow temporary suspension of a connection when a service does not need to be performed on the data stream, which reduces processing load. The extended socket API also supports large numbers of concurrent connections.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing a socket API, comprising:
   receiving data at an inbound network socket, the inbound network socket terminating a client-side connection;
   opening an outbound network socket, the outbound network socket terminating a server-side connection;
   associating the inbound network socket and the outbound network socket using a socket file descriptor of the client-side connection; and
   directing the data from the inbound network socket to the outbound network socket.

2. The method of claim 1, wherein associating the inbound network socket and the outbound network socket further comprises expressly identifying the socket file descriptor of the client-side connection when opening the outbound network socket.

3. The method of claim 2, wherein the socket file descriptor of the client-side connection comprises an IP address and a source port of a client device.

4. The method of claim 1, further comprising closing at least one of the inbound network socket and the outbound network socket.

5. A method for providing application services, comprising:
   receiving data at an inbound network socket, the inbound network socket terminating a client-side connection;
   opening an outbound network socket, the outbound network socket terminating a server-side connection;
   associating the inbound network socket and the outbound network socket using a socket file descriptor of the client-side connection;
   directing the data from the inbound network socket to the outbound network socket; and
   processing the data.

6. The method of claim 5, wherein associating the inbound network socket and the outbound network socket further comprises expressly identifying the socket file descriptor of the client-side connection when opening the outbound network socket.

7. The method of claim 6, wherein the socket file descriptor of the client-side connection comprises an IP address and a source port of a client device.

8. The method of claim 5, further comprising closing at least one of the inbound network socket and the outbound network socket.

9. The method of claim 5, further comprising unproxying the inbound network socket and the outbound network socket, wherein a portion of the data is directed from the inbound network socket to the outbound network socket without being processed while the inbound network socket and the outbound network socket are unproxied.

10. The method of claim 9, wherein the inbound network socket and the outbound network socket are unproxied until a predetermined amount of data is directed between the inbound network socket and the outbound network socket.

11. The method of claim 9, further comprising proxying the inbound network socket and the outbound network socket after unproxying the inbound network socket and the outbound network socket, wherein the data directed from the inbound network socket to the outbound network socket is processed when the inbound network socket and the outbound network socket are proxied.

12. The method of claim 5, wherein processing the data further comprises providing a service function.

13. The method of claim 12, wherein the service function is a server load-balancing function.

14. The method of claim 12, further comprising:
    transmitting the data through the outbound network socket; and
    providing a second service function.

15. The method of claim 14, wherein the second service function provides a different type of service than the service function.

16. The method of claim 15, wherein the service function and the second service function provide L7 services.

17. A non-transitory computer-readable storage medium having computer-executable instructions stored thereon for providing an application service that, when executed by a computing device, cause the computing device to:
    receive data at an inbound network socket, the inbound network socket terminating a client-side connection;
    open an outbound network socket, the outbound network socket terminating a server-side connection;
    associate the inbound network socket and the outbound network socket using a socket file descriptor of the client-side connection;
    direct the data from the inbound network socket to the outbound network socket; and
    process the data.

18. The non-transitory computer-readable storage medium of claim 17, having further computer-executable instructions stored thereon that, when executed by the computing device, cause the computing device to associate the inbound network socket and a the outbound network socket by expressly identifying the socket file descriptor of the client-side connection when opening the outbound network socket.

19. The non-transitory computer-readable storage medium of claim 18, wherein the socket file descriptor of the client-side connection comprises an IP address and a source port of a client device.

20. The non-transitory computer-readable storage medium of claim 17, having further computer-executable instructions stored thereon that, when executed by the computing device, cause the computing device to unproxy the inbound network socket and the outbound network socket, wherein a portion of the data is directed from the inbound network socket to the outbound network socket without being processed while the inbound network socket and the outbound network socket are unproxied.

* * * * *